United States Patent [19]

Hochberg et al.

[11] 3,782,367

[45] Jan. 1, 1974

[54] "PACEMAKER" MONITORING TECHNIQUE AND SYSTEM

[75] Inventors: Howard Martin Hochberg, East Windsor, N.J.; Eugene King, Yardley, Pa.

[73] Assignee: Hoffman-La Roche Inc., Nutley, N.J.

[22] Filed: Feb. 25, 1972

[21] Appl. No.: 229,495

[52] U.S. Cl. .......................... 128/2.06 A, 128/419 P

[51] Int. Cl. .................................................. A61b 5/04

[58] Field of Search .................. 128/2.05 R, 2.06 A, 128/2.06 R, 419 P, 421, 422

[56] References Cited

UNITED STATES PATENTS

| | | | |
|---|---|---|---|
| 3,426,748 | 2/1969 | Bowers | 128/419 P |
| 3,648,707 | 3/1972 | Greatbatch | 128/419 P |
| 3,651,799 | 3/1972 | Daynard | 128/419 P |
| 3,651,806 | 3/1972 | Hirshberg | 128/2.06 R |
| 3,662,759 | 5/1972 | Dabolt | 128/419 P |

*Primary Examiner*—William E. Kamm

*Attorney*—Samuel L. Welt et al.

[57] ABSTRACT

A monitoring system operates to indicate the effectiveness of cardiac pacer operation in a cardiac pacer carrying patient. A predetermined time interval from the onset of a pacer spike defines minimum and maximum specific times as criteria for establishing digital techniques to ascertain a capture event or whether the patient's QRS is driven by the pacer spike. Additional digital circuitry indicates when a non-capture event has occurred as the cardiac pacer output has failed. By selective switching which includes proper routing of the atrial and ventricular spikes, the system is adapted to monitor atrial, ventricular and atrial-ventricular sequential pacing, whether in the fixed or demand modes. With atrial-ventricular sequential pacing the predetermined interval from onset of the atrial spike defines minimum and maximum times to ascertain if atrial-ventricular capture has occurred.

23 Claims, 13 Drawing Figures

| PACING MODE (S) | 1 | 2 | 3 | 4 | 5 | 6 | 7 | 8 | 9 | 10 | 11 | 12 |
|---|---|---|---|---|---|---|---|---|---|---|---|---|
| VENTRICULAR FIXED | a | b | a | b | b | a | a | b | a | b | b | b |
| VENTRICULAR DEMAND | a | b | b | b | b | a | a | b | b | b | b | b |
| A-V SEQUENTIAL FIXED | b | b | a | b | a | b | b | a | b | b | a | b |
| A-V SEQUENTIAL DEMAND | b | b | b | a | a | b | b | a | b | a | b | b |
| ATRIAL FIXED | b | a | a | a | b | a | a | b | b | b | b | a |
| ATRIAL DEMAND | b | a | b | a | b | a | a | b | b | b | b | b |

FIG. 6

"PACEMAKER" MONITORING TECHNIQUE AND SYSTEM

BACKGROUND OF THE INVENTION

Patients with cardiac pacers may have difficulties, especially in the acute phase of their illness and immediately following insertion of the pacer, from failure of the cardiac pacer to properly control (capture) the heartbeat. This may reflect problems in the electronics, the wire, the placement of the wire, or the myocardinum. The most catastrophic event is failure of the pacer to capture (non-capture).

To ensure effectual pacing, pacer patients must be monitored to determine if the cardiac pacer is functioning properly and if appropriate benefit is being derived. Specifically, it is important to know how often and why a pacer is activated, whether it is firing at appropriate times, whether it is, in fact, capturing (driving) the heart to produce a QRS response to a cardiac pacer stimulation, or if it is having deleterious effects. Frequent or constant use of a demand pacer may indicate need for another type of cardiac pacer (fixed rate, external or implanted). Inappropriate firing may result in mechanically ineffective beats or in certain circumstances may lead to ventricular defibrillation. If no QRS is produced (non-capture), the pacer catheter either has been placed incorrectly, has wandered from its original placement, has not enough energy, or has developed a mechanical fault. In any case, the patient may be placed in serious jeopardy.

Unfortunately, no system is now available for automatically monitoring cardiac pacer whether they be of the implanted or external type. A standard EKG monitor system often effectively counts the rate of cardiac pacer firing, as evidenced by the pacer "artifact" on the EKG. This gives no information about the: effectiveness and reliability of the pacing system; deleterious effects which are potentially very dangerous (e.g., artifact on T waves), or; the frequency of use of the pacer over a period of time (necessary to judge when to remove a temporary system). Reliance is placed upon frequent human observations of the EKG, at best a marginally effective method. The pacer funtion monitor which could provide the above information and alarms when appropriate, would be a tool of major clinical usefulness.

SUMMARY

The present invention is designed to obviate problems such as those noted above by providing a method and apparatus for automatically analyzing the rhythms of the most common forms of cardiac pacer and alarm if non-capture as a failure of pacer output occurs. The above is accomplished by providing for features including event counting to allow for analysis of long term use of certain types of pacers (e.g. demand pacer with R suppression of the pacer spike). Information is derived to automatically determine if the pacer itself has failed, by providing multiple criteria for logic circuitry. Among other things the logic circuitry is designed for analyzing: fixed rate (ventricular) pacing; demand (ventricular) pacing; atrial-ventricular sequential fixed rate pacing; atrial-ventricular sequential demand pacing, atrial fixed rate pacing; and atrial demand pacing. The criteria to be detected includes: loss of spike; EKG rate below a preset limit and no spike; delay between spike and QRS out of specification; non-capture; capture events, alarm events, etc. If the pacer totally fails, the patient will revert to his usual rhythm (most often a slower rate) and this will be alarm by the usual heart rate alarms of patient monitors. The present invention also provides for alarming the case of total failure of the fixed rate pacer modes.

PACING MODE DEFINITIONS

Preliminary to the foregoing description, it is believed to be expedient to briefly review the several major types of external and implantable cardiac pacer which will be referred to in the description of the present invention. First, is fixed rate (ventricular) pacing, which is the simplest form of cardiac stimulation at a preset rate. Here pacing is independent of the electrical activity of the heart and may result in competition between the paced beats and the patient's intrinsic system. In demand ventricular pacing the ventricular-inhibited demand pacing stimulates only when the patient's ventricular rate falls below a preset rate of the pacer. When the heart rate is above this level, the output of the cardiac pacer is suppressed and no pacing spikes occur. Accordingly, the patient's heart goes in and out of capture (QRS response to a cardiac pacer stimulation within a preset time) as demanded. A second type of ventricular triggered demand pacer fires ineffectively into the QRS when the rate is sufficient and paces the heart if the rate is too slow.

Atrial-ventricular sequential fixed rate pacing calls for the atrial cardiac pacer pulse to stimulate the atria and with a preset sequential interval the ventricular cardiac pacer pulse stimulates the ventricle in case of abnormal atrial rhythms coupled with heart block between A-V node and HIS-bundle (A-V block). In atrial-ventricular demand pacing the pacer is controlled by ventricular depolarization and its stimulation are automatically adapted to the patient's needs. The demand pacing facilitates the natural cardiac depolarization sequencing without competing with spontaneous electrical activity. The patient goes in and out of pacing as required by his instrinsic system.

Atrial fixed pacing calls for the pacer to stimulate the atria, the ventricle depolarizing in the normal manner. In this case, in the presence of bradycardia and normal atrio-ventricular conduction, the atrium is paced while the ventricular cardiac pacer pulse is inhibited or not supplied. In atrial demand pacing, as in any other demand pacing mode, the patient goes in to a pacing mode when the patient's heart rate falls below a preset rate of the pacer. This non-competitive pacing facilitates the natural cardiac depolarization sequence without competing with spontaneous heart activity.

BRIEF DESCRIPTION OF THE DRAWINGS

FIG. 6 is a table illustrating the switch terminal connections for each of the spacing mode states.

DESCRIPTION OF THE PREFERRED EMBODIMENT

Figure 1:
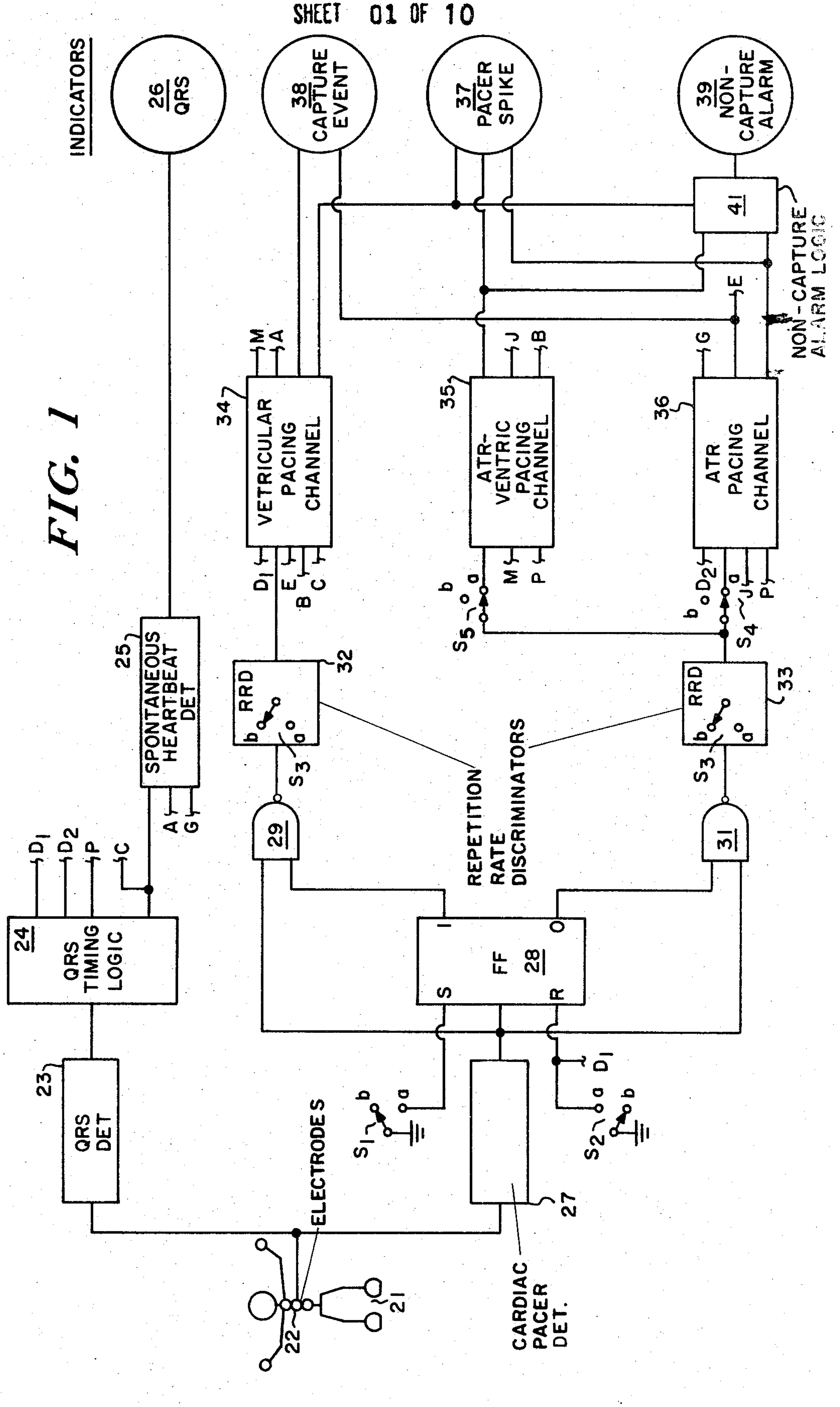
FIG. 1 is a schematic block diagram generally illustrating the overall composition of a pacer function monitoring system according to the present invention.

GENERAL DESCRIPTION - With reference to the Figures there is shown at FIG. 1, a patient 21 having electrodes 22 connected to a QRS detector 23 for analyzing a QRS waveform to develop a QRS trigger signal representative of the patient generated QRS complex. Although any suitable QRS detector could be employed, a preferred one is that disclosed in a copending U.S. Pat. application No. 195,396 by Eugene King for ARRHYTHMIA DETECTION TECHNIQUE, filed Nov. 3, 1971.

The QRS detector output is fed to a QRS unit 24 for use in developing QRS timing signals to be employed in a manner as will be discussed hereinafter. A spontaneous heartbeat detector 25 connected from the QRS timing logic 24 is adapted to detect QRS signals in the absence of a pacer pulse or occurring after a predetermined period of occurrence of a pacer pulse, which QRS signals energize a QRS indicator 26 enabling these events to be observed. QRS signals occurring during atrial, ventricular or atrial-ventricular sequential capture events are inhibited by way of signals A and G also supplied to the spontaneous heartbeat detector 25.

Signals derived from patient 21 are also routed to a pacer detector 27 of the type adapted for detecting a pacer spike from patients with cardiac pacers. Although any suitable pacer detector could be employed, the preferred one is that disclosed in applicant's copending U.S. Patent Application entitled PACEMAKER MONITORING by Eugene King filed simultaneously herewith.

The output of cardiac pacer detector 27 generates a fixed duration digital output pulse preferably of 10 or 20 ms width. The cardiac pacer detector 27 is connected to an atrial-ventricular (A-V) toggle flip-flop switch 28 which has set and reset inputs connected from terminals (a). Switches $S_1$ and $S_2$ coupled from ground, may be respectively connected to these input terminals (a) or to the terminal positions (b). The reset input of flip-flop 28 is also connected from the QRS timing logic 24 to be provided with a QRS reset pulse denoted by $D_1$. The cardiac pacer detector 27 output is also connected to each of a pair of NAND gates 29 and 31, each further connected respectively from the one and zero outputs of flip-flop 28, which, for convenience will all be referred to as the A-V toggle switch. The A-V toggle switch essentially acts as a vehicle for routing the pulses derived from the cardiac pacer detector 27. Specifically, in the present embodiment, if the patient being monitored has a ventricular pacing system the ventricular pacer pulses are routed by way of NAND gate 29. On the other hand, should the patient have an atrial pacing system, the atrial pacer pulses are routed via NAND gate 31. When an atrial-ventricular (A-V) pacing system is used, the first pacer pulses detected which would normally be the atrial pulses, are routed via NAND gate 31 and the switch is toggled so that the subsequent pacer pulses derived, which would normally be ventricular pulses, would be routed via NAND gate 29.

As will be disclosed in greater detail hereinafter, the particular switching arrangement of the A-V toggle switch is predetermined by the pacing mode selected for monitoring purposes, which in turn, is determined by the particular cardiac pacer configuration carried by the patient being monitored. Based on the latter, switches $S_1$ and $S_2$ will be selectively coupled with either contacts (a) or (b) as shown in the table of FIG. 6.

Repetition rate discriminators (RRD) 32 and 33 are respectively coupled from NAND gates 29 and 31. Each of these discriminators is provided with a switch $S_3$ for connection to either a terminal (a) or (b), the connection again being determined by the particular pacing mode being monitored. RRD 32, is in turn connected to a ventricular pacing channel 34 which is also connected from each QRS timing logic 24, atrial-ventricular (A-V) pacing channel 35, and atrial pacing channel 36. The ventricular pacing channel is connected to each, the A-V pacing channel 35, spontaneous heartbeat detector 25, a pacer spike non-capture indicator 37, a capture event indicator 38, and a non-capture alarm indicator 39 via non-capture alarm logic 41. RRD 33 is connected to the A-V pacing channel 35 via switch $S_5$, when connected to terminal (a), and also to atrial pacing channel 36 via switch $S_4$ when connected to terminal (a). The A-V pacing channel 35 is also connected from QRS timing logic 24, and the ventricular pacing channel. Its output is coupled to pacer spike non-capture indicator 37 and non-capture alarm indicator 39 via non-capture alarm logic 41. The atrial pacing channel 36 is connected from the QRS timing logic 24 and A-V pacing channel 35. Its output is connected to the spontaneous heartbeat detector 25, capture event indicator 38, pacer spike non-capture indicator 37, and non-capture alarm indicator 39 via non-capture alarm logic 41.

Each of the indicators 26, 37, 38 and 39 could be of the visible and/or audible type. In the present embodiment one of the indicators employed might be one of a visible type having a colored coded illuminator which is driven by, for example, a 200 ms one shot unit. In addition a counter is also provided to be activated to provide accumulative indications of a count of capture events, non-capture events, spontaneous heartbeat events and non-capture alarm events, etc.

TIMING CHANNEL

Figure 3:
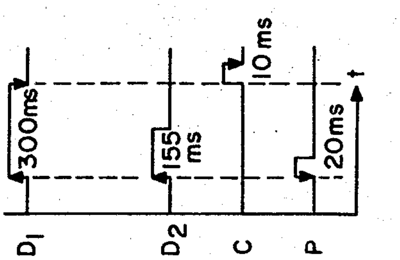
FIG. 3 depicts a plurality of time related waveforms to illustrate the relationship of the timing pulses derived from the QRS timing logic 24.
Figure 2:
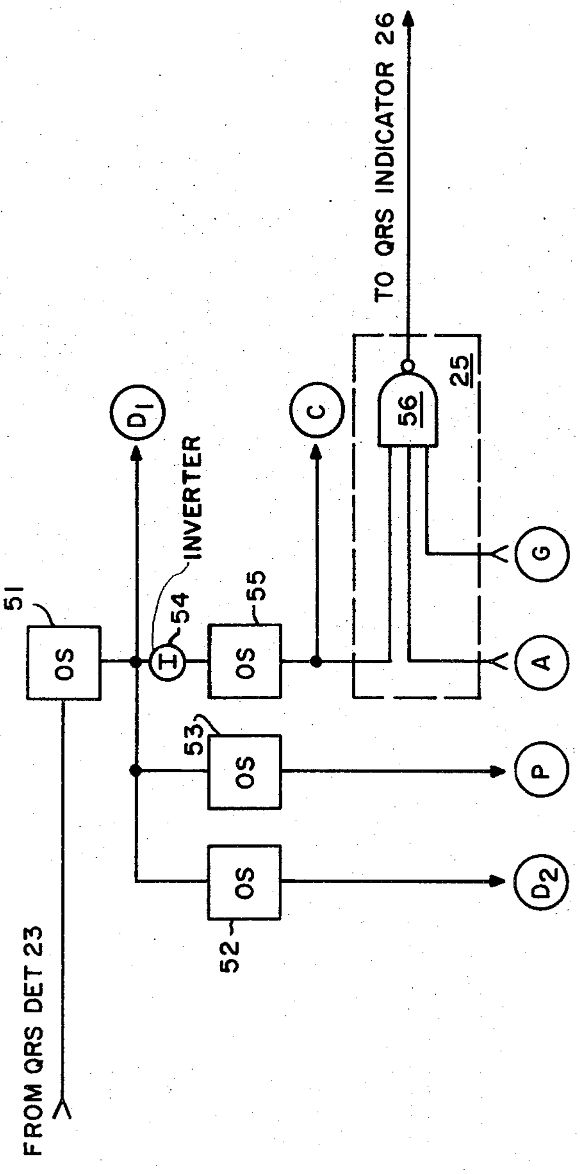
FIG. 2 illustrates a detailed schematic diagram of the QRS timing logic 24 and spontaneous heartbeat detector 25 shown in FIG. 1.

With reference to FIGS. 2 and 3, the QRS timing logic 24 essentially consists of several derived timing signals which are based on the QRS detector 23 output which triggers a one shot multivibrator unit 51 to generate a 300 ms pulse, denoted as $D_1$ in FIG. 3. The one shot unit 51 in turn is connected for triggering a one shot unit 52 to generate a 155 ms pulse denoted as $D_2$ at the leading edge of $D_1$. The leading edge of the 300 ms pulse $D_1$ will also trigger one shot unit 53 connected from one shot unit 51, for generating the timing pulse 20 ms denoted as P. A 10 ms timing pulse denoted as C, is generated by a one shot 55 which is triggered by the trailing edge of the 300 ms pulse $D_1$ via inverter 54.

SPONTANEOUS HEARTBEAT DETECTOR

Again with reference to FIG. 2, the spontaneous heartbeat detector 25 is shown to include a NAND gate 56 connected from O.S. 55 and also supplied by inhibition signals A and G respectively from the ventricular pacing channel 34 and atrial pacing channel 26. The spontaneous heartbeat indicator will thus activate the QRS indicator 26 upon presence of a QRS complex except as to the QRS complex occurring during ventricular or atrial capture.

REPETITION RATE DISCRIMINATOR

Figure 4:
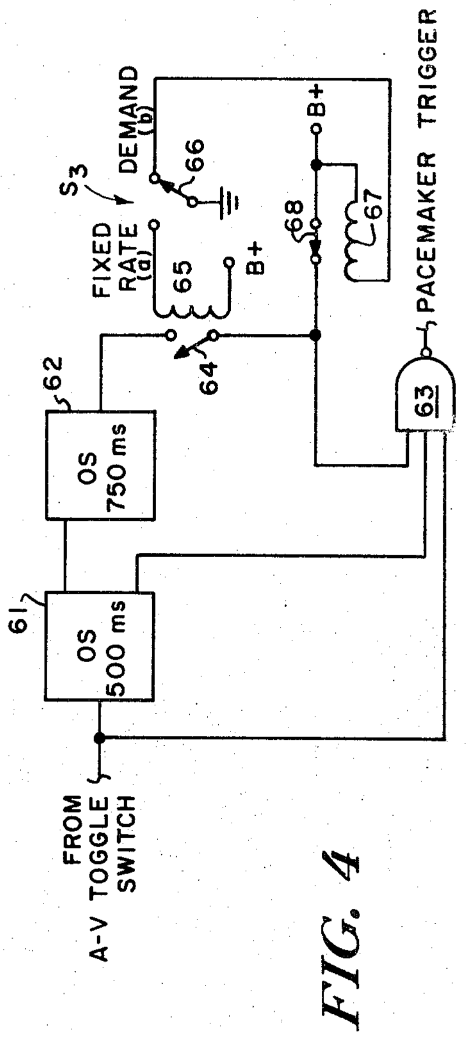
FIG. 4 shows a detailed schematic diagram of the repetition rate discriminators 32, 33 of FIG. 1.

The output pulses from the A-V toggle switch, as illustrated in FIG. 1, are discriminated from a repetition rate standpoint to provide a reliable cardiac pacer trigger pulse for monitoring purposes. The switches $S_3$ adapt the repetition rate discrimination units for either use with a continuous asynchronous cardiac pacer or a demand cardiac pacer. In particular, with reference to FIG. 4, there is shown a retriggerable one shot 61 connected from the A-V toggle flip-flop 28 which one shot generates a 500 ms pulse, the one shot in turn being connected to a second retriggerable one shot 62 which generates a 750 ms pulse. NAND gate 63 is connected from the negative output of one shot unit 61, from the one shot unit 62 and also from A-V toggle 28 which passes the cardiac pacer detector generated 10 ms pulse.

The lead connection intermediate one shot 62 and NAND gate 63, is interrupted by a switch 64 which is controlled by relay 65 via a manually operable switch 66. The position of switch 66 will depend on whether a continuous asynchronous cardiac pacer (fixed rate) or demand type pacer unit is being monitored. In the fixed rate position relay 65 is activated to close switch 64 in the (a) position and thus supply an output from one shot unit 62 to the NAND gate 63. With switch 66 in a demand position relay 65 is deactivated to open switch 64 in the (b) position and relay 67 is activated to close the switch 68, to supply a fixed potential to the same input terminal of NAND gate 63. The output of NAND gate 63 provides a cardiac pacer trigger signal. It should be understood, of course, that any suitable switching means could be used, e.g., digital manual or relay type.

Operation of the repetition rate discriminator may best be described with reference to FIG. 5, where an output pacer pulse denoted as "*p*" and a noise pulse denoted as "*n*," are emitted from A-V toggle 28. The first three lines represent switch 66 being in the demand position and where the demand pacer has a pulse rate of 750 ms. The next four waveforms represent switch 66 being in a fixed position and where the fixed pacer has a pulse rate of about 1,000 ms. As illustrated, retriggerable one shot 61 is triggered by pulses *p* and *n*, the inverted output of which is fed to NAND gate 63 and the non-inverted output of which is used for triggering the retriggerable 750 ms one shot 62.

The 500 ms period of one shot 61 is equivalent to a repetition rate of approximately 120 beats per minute and serves to exclude pulse information which exceeds this rate. A lower end demarcation is formed by the combined one shot units 28 and 29 which provide a combined period equivalent to 48 b/m below which pulse information is rejected. This, in effect, provides an overall window of about 48 b/m to 120 b/m for passing pacer pulses. Pacers do not normally run at a rate lower than 50 b/m or higher than 120 b/m.

Figure 5:
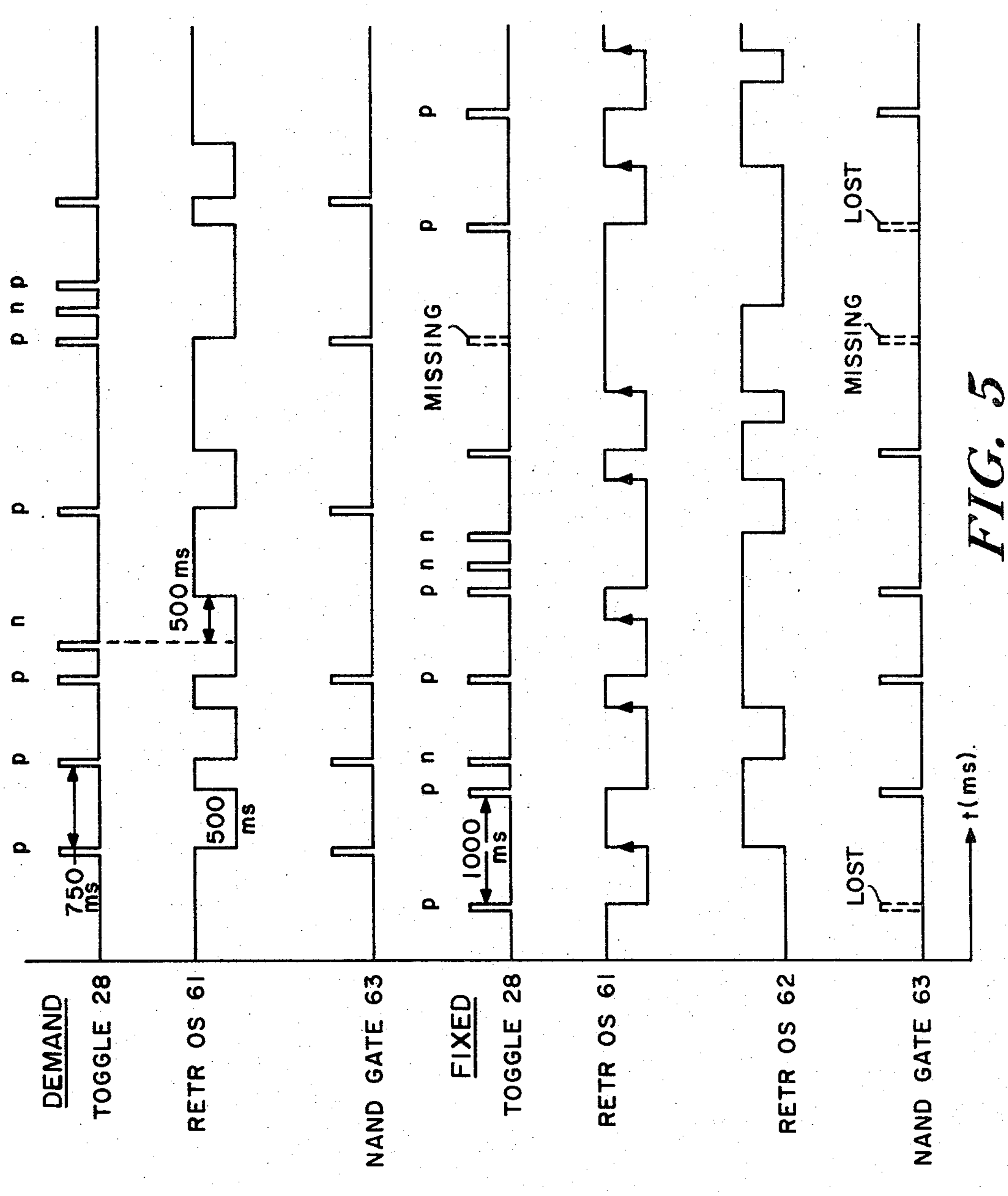
FIG. 5 depicts a plurality of time related waveforms to illustrate the operation of the repetition rate discriminator shown in FIG. 4.

In the demand operational state the noise pulses n, as is depicted in FIG. 5 will be eliminated at the NAND gate 63 output by the 500 ms retriggerable one shot. When these noise pulses effectively increase the overall rate to above 120 b/m. No lower end demarcation is used in the demand operational state as this would cause a first pulse *p* and/or a pulse *p* following on the heels of a missing cardiac pacer pulse to be lost which would be catastrophic in the demand operational state. In the fixed operational state, noise pulses n occurring above or below the 48 to 120 ms window are rejected. Use of the lower end rejection gate (below 48 b/m), presents no problem in the fixed operational state as any missing cardiac pacer pulse in this state is normally sufficient to actuate an alarm.

PACING CHANNEL DESCRIPTION

To facilitate description of the ventricular, atrial-ventricular and atrial pacing channels, we shall assume for expediency sake, that the pacer patient being monitored has a cardiac pacer of the atrial-ventricular sequential demand type. As may be observed from the table at FIG. 6, a different set of terminal connections for switches $S_1$ - $S_{12}$ is determined by the mode selected from the six different types of pacing modes shown. It should be noted that although one pacing mode, e.g., A-V sequential demand may be monitored, signals from the other pacing channels, e.g., atrial and ventricular, may still be employed, as will become apparent. As will be seen, common to each of the pacing channels is the establishment of a range of specified upper and lower time limits from the occurrence of an atrial and/or ventricular spike for deriving capture events indicative of effectual operation of the cardiac pacer being monitored.

VENTRICULAR PACING CHANNEL

In the A-V sequential demand mode the ventricular pacing channel operation is, in part, determined by the relevant switching arrangement presented in FIG. 6. The ventricular pacing channel essentially revolves about the detection of ventricular capture which may be defined as response of stimulation by production of a QRS trigger within a period of 300 ms of the ventricular pacer spike. In the present embodiment this is achieved by having the QRS trigger generate a 300 ms time slot which might be denoted as the ventricular capture window. If the QRS response occurs later than 300 ms from the onset of the pacemaker stimuli, non-capture has occurred.

In the A-V sequential demand mode, switches $S_3$ in the repetition rate discriminators 32, 33 (see FIG. 1) are open to effectively reduce the noise inhibition capability of the repetition rate discriminators. This is necessary as with the occurrence of a spontaneous heartbeat, one might otherwise lose the A and or V spikes.

Figure 7:
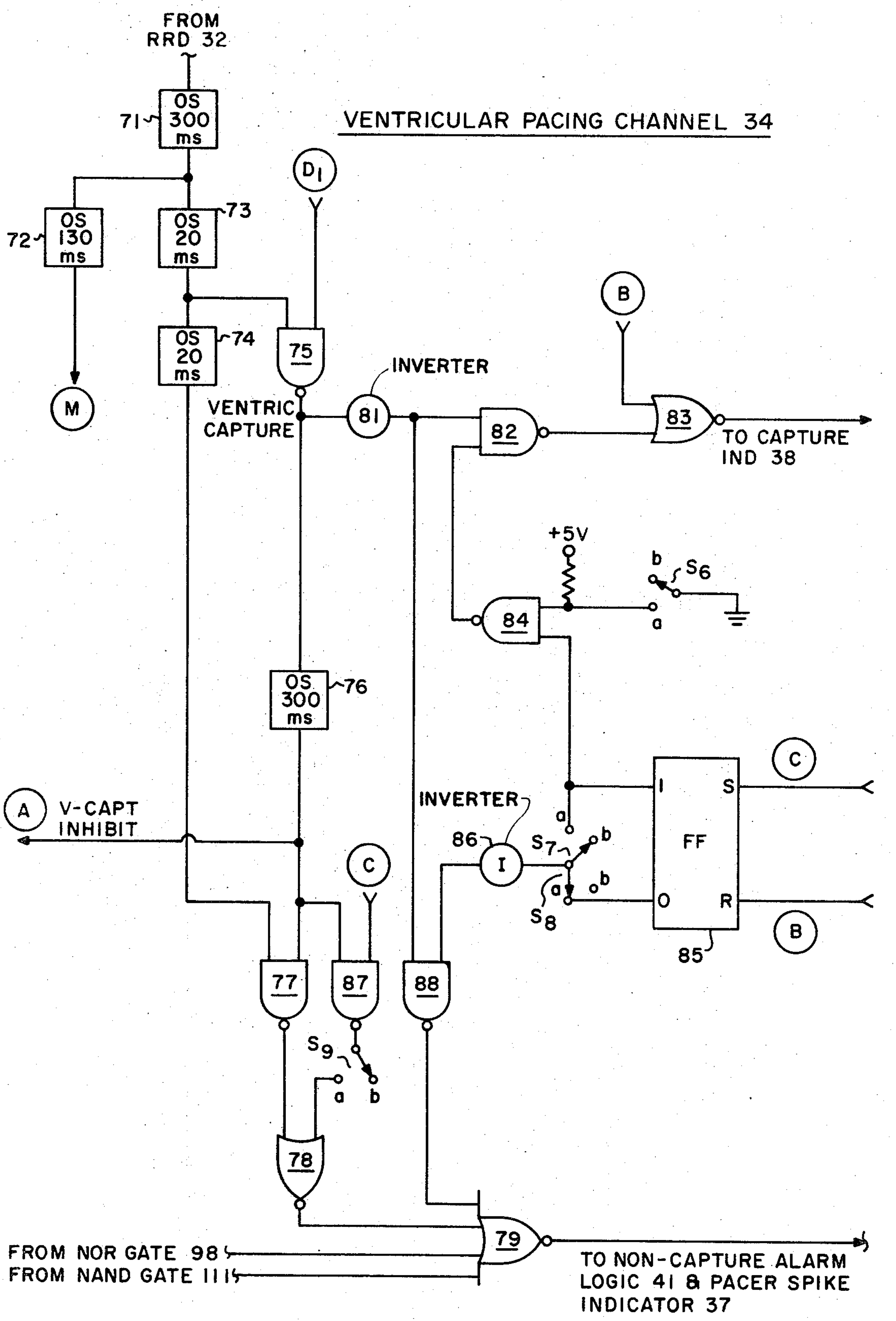
FIG. 7 is a more detailed schematic diagram of the ventricular pacing channel 34 circuit in FIG. 1.

With reference to FIG. 7 in A-V sequential demand pacing, a pulse from RRD 32 of FIG. 1 will trigger a 300 ms one shot unit 71 dictating the upper capture range, the trailing edge of which will trigger a one shot unit 73 to generate a 20 ms pulse representative of the A spike delayed, the trailing edge of which, in turn, triggers yet another 20 ms one shot unit 74. The leading edge of the 300 ms pulse from one shot 71 also triggers a one shot unit 72 to develop a 130 ms pulse designated as M. The 20 ms pulse from one shot 73 will enable a NAND gate 75, if occurring within the window formed by the 300 ms QRS derived pulsed $D_1$. Upon simultaneously signals present at NAND gate 75 an output pulse indicative of ventricular capture is generated. The latter pulse triggers a one shot unit 76 connected to a NAND gate 77, to provide a 300 ms pulse denoted as a V-capture inhibit pulse A. The 20 ms pulse from one shot 74 which is supplied to NAND gate 77 will be inhibited if the 300 ms V-capture inhibit pulse is present. Thus, NAND gate 77 is not enabled to prevent an output signal at, neither NOR gate 78 to which NAND gate 77 is connected nor at NOR gate 79 to which NOR gate 78 is connected. Assuming, however, that the input signals to NAND gate 75 would not occur simultaneously, one shot 76 is not triggered and NAND gate 77 would be enabled and the 20 ms pulse from one shot 74 would be passed by NAND gate 77 and by NOR gates 78 and 79 to the non-capture alarm logic 41 and the non-capture pacer spike indicator 37, illustrated in FIG. 1.

NAND gate 75 is further connected to the inverter 81 and thence to a NAND gate 82 coupled to a NOR gate 83. NAND gate 82, which is connected from a NAND gate 84 is enabled when NAND gate 84 is high. A flip-flop 85 connected to NAND gate 84, has a set input triggered by the QRS pseudo spike C and a reset input triggered by a pulse B indicative of A-V capture, the latter signal being derived from the A-V pacing channel to be hereinafter discussed. Thus, the normally positive output signal from flip-flop 85 will be set low in the presence of an A-V capture signal B. In such a case, the output of NAND gate 84 goes high to enable NAND gate 82. An output pulse from NAND gate 82 will be routed through NOR gate 83 to the capture event indicator 38. The signal from the zero output of the flip-flop 85 in fed via an inverter 86 to NAND gate 88. This inverted input signal to NAND gate 88, is, in effect, the same output from the one output of flip-flop 85. With the presence of the A-V capture event pulse B, NAND gate 88 which is connected to NOR gate 79 is not enabled. NAND gate 87 is only employed in the ventricular fixed mode as is illustrated in FIG. 6, when switch 9 is connected to terminal point (a).

Figure 8:
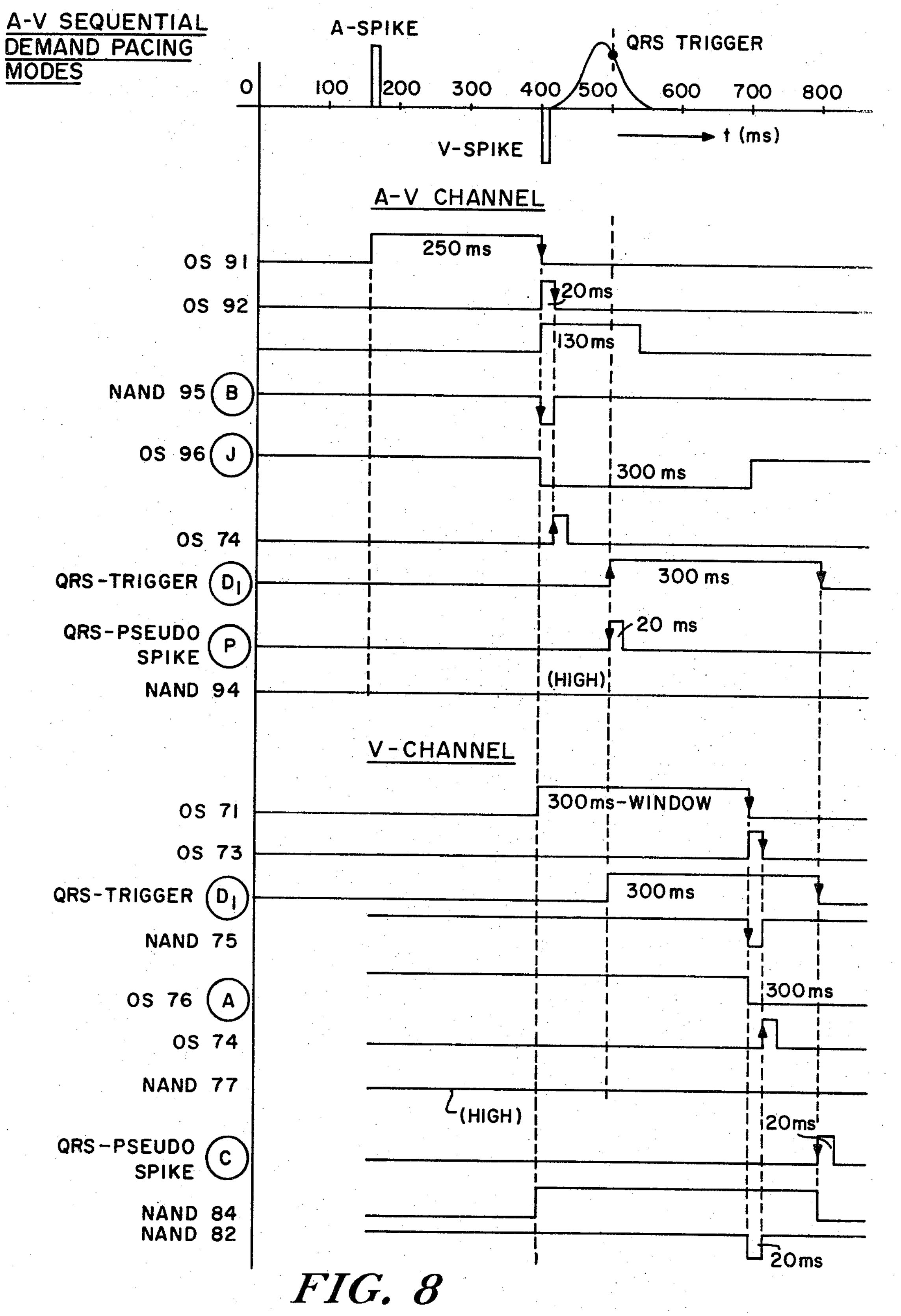
FIG. 8 illustrates time related waveforms to show the operation of the ventricular and atrial-ventricular pacing channels with certain assumed pacer and QRS signals in the A-V sequential demand pacing mode.

In the A-V sequential demand pacing mode, with reference to FIG. 8, assuming a patient derived electrical signal with A and V spikes present, due to the delayed V spike from O.S. 73 falling within the 300 ms capture window defined by the QRS pulse $D_1$, a V-capture indication will be present at the output of NAND gate 75. In the A-V sequential demand mode, with the assumed electrode derived output, A-V capture B will occur as will hereinafter become apparent with reference to the A-V pacing channel. Thus, before V-capture event the flip-flop 85 one output will be set low to set the NAND gate 84 output high to allow NAND gate 82 to be enabled with an output pulse from inverter 81, to activate the capture event indicator 38 via NOR gate 83.

Assuming the presence of an A spike about 120 ms from the QRS trigger and a missing V spike, one shot 71 will not be triggered due to the absence of the missing V pulse as the first pulse (the A pulse) would have been routed via the A-V toggle flip-flop 28 to the A-V and atrial pacing channels. However, the non-capture is not denoted by the ventricular pacing channel for the reason that the QRS trigger which may respond spontaneously in the A-V sequential demand mode can inhibit the V spike. Accordingly, as long as atrial capture is taking place, as will be discussed with relation to the atrial pacing channel, and a QRS trigger is present, a non-capture event will not be indicated. Again, in the A-V sequential demand mode assuming no spike whatsoever or only a V-spike, then the first spike, if any, is routed to the A-V and atrial pacing channels and the ventricular pacing channel will be prevented from providing any indicator output as one shot 71 is not triggered.

ATRIAL-VENTRICULAR (A-V) CHANNEL

In turning back to FIG. 1, the output from repetition rate discriminator 33 in the A-V demand mode, is shown to be applied via switch $S_5$ and terminal (a) to the A-V pacing channel which is set in the switching arrangement disclosed in the table of FIG. 6. The A-V pacing channel revolves about the detecting of A-V capture which may be defined as response of a V spike within a period of 120 ms to 250 ms of the A spike. In the present embodiment, this is achieved by having the V spike generate a 130 ms time slot which might be denoted as the A-V capture window. If the V spike occurs later or earlier than the 120–250 ms period from the onset of an A spike, non-capture has occurred.

Figure 9:
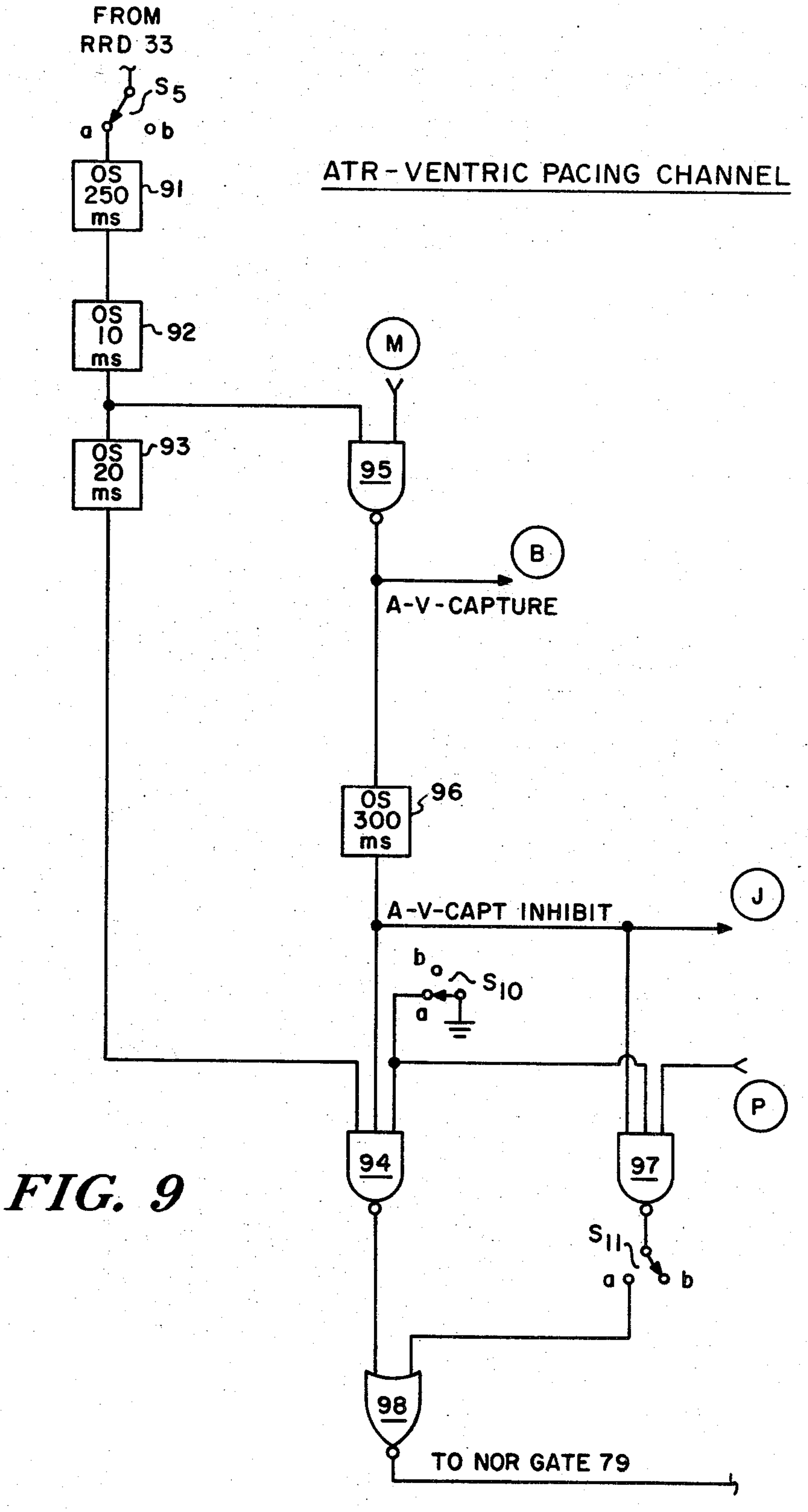
FIG. 9 is a more detailed schematic diagram of the atrial-ventricular pacing channel 35 circuit in FIG. 1.

The A-V pacing channel, in FIG. 9, discloses at its input a one shot 250 ms unit 91 dictating the upper limit of the capture range and connected to trigger at its trailing edge, a one shot 10 or 20 ms unit 92 representative of the A spike delayed. The O.S. unit 92, at its trailing edge, in turn, triggers another one shot 20 ms unit 93 connected to a NAND gate 94. The 20 ms output puse from one shot 92 is also fed to one input of a NAND gate 95, the second input of which is a 130 ms pulse M derived at O.S. 72 of the ventricular pacing channel from the trailing edge of the 300 ms pulse triggered by the ventricular spike, if present. The criteria for A-V capture is, in effect, set by the A spike one shot 91 period and the V spike one shot 72 period which periods are determined by the minimum and maximum specified time range that might exist between the A spike and V spike. The latter is set as NAND gate 95, having an output B, so that enabling of NAND gate 95 is indicative of A-V capture. With brief reference back to FIG. 7, signal B is applied to NOR gate 83 and thence to activate capture event indicator 38.

NAND gate 95 is connected to the one shot 300 ms unit 96, which, when triggered, generates a 300 ms A-V capture inhibit pulse denoted as J. NAND gate 94 and NAND gate 97 are connected from O.S. unit 96. NAND gates 94 and 97 are also connected from a terminal (a) of switch $S_{10}$ which when closed maintains a low input to the NAND gates to prevent them from being enabled in the A-V sequential demand mode.

As was previously indicated, in the A-V sequential demand mode stimulations from the pacer are automatically adapted to the patient's needs, to put the patient in and out of pacing as required by this intrinsic system. Thus, in many instances, where a V spike is absent the pacer may be working properly and, accordingly, is desired to not activate the non-capture event indicator or alarm logic. In the A-V sequential demand mode, switch $S_{10}$ prevents NAND gates 94 and 97 from being enabled. It should be noted that if the QRS complex is not present at the proper intervals, the patient's condition will be alarmed through the QRS-rate meter limits of the conventional rate meter unit or pacer rate meter. NAND gate 97 is also supplied by a pulse P from the QRS timing logic. NAND gate 94 is connected to a NOR gate 98 which is also connected via switch $S_{11}$ from NAND gate 97, the NOR gate 98 being corrected to the NOR gate 79 in the ventricular pacing channel which in turn is connected to the non-capture alarm logic 41 shown in FIG. 1.

In turning again to FIG. 8, with the assumed A and V spikes and QRS trigger, due to the occurrence of a V spike within a period of 120 to 250 ms after the A spike, NAND gate 95 is enabled to go low providing an indication of A-V capture to activate capture event indicator 37. NAND gates 94 and 97 are disabled during occurrence of output pulses from O.S. 93 and pulse P, due to the low input from ground via switch $S_{10}$.

Assuming a different patient derived signal other than that exhibited in FIG. 8, i.e. an A spike only, no spike whatsoever, or a V spike only, in each of these instances it is clear that A-V capture will not occur at the output of NAND GATE 95. Accordingly there will be no A-V capture inhibit at the output of one shot 96. In this instance, the only indication that might be observed with either an A,V, or A and V pulse absence will be the QRS indicator 26, assuming a spontaneous heartbeat is present. If not present, the conventional heart rate meter will sense the irregularity and indicate an alarm condition. Again, the A-V sequential demand mode, the A and/or V spikes will only be present upon demand, therefore, their absence for the most part is of no consequence as long as the heart rate meter does not indicate a lower heartbeat rate.

ATRIAL PACING CHANNEL

In turning back again to FIG. 1, in the A-V sequential demand mode, the first spike in each sequence of signals coming from the patient is also routed via the toggle flip-flop 28 through repetition rate discriminator 33 through switch $S_4$, terminal (a) into the atrial pacing channel. As previously indicated, the terminal connections of the switches in the atrial pacing channel are denoted at the table in FIG. 6 for the cardiac pacer type unit being monitored, which in the instant example is the A-V sequential demand mode. The atrial pacing channel basically revolves about the detection of QRS capture which may be defined as response to an A spike stimulation by production of a QRS trigger within a period of approximately 120 ms to 275 ms from the onset of the A spike.

Figure 10:
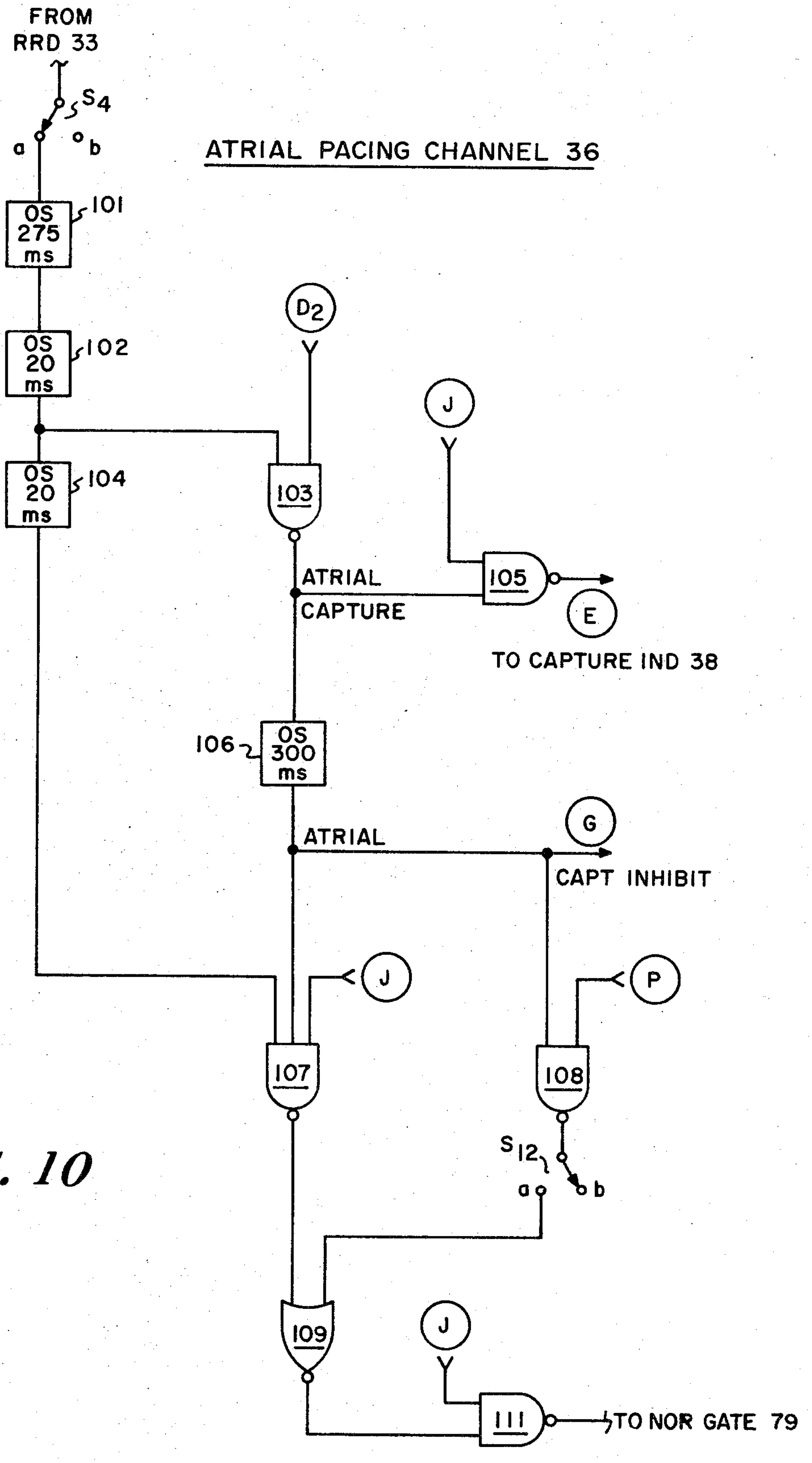
FIG. 10 is a more detailed schematic diagram of the atrial pacing channel circuit 36 in FIG. 1.

With reference to FIG. 10, at the input to the atrial pacing channel a one shot 101 generates a 275 ms pulse the trailing edge of which triggers a one shot unit 102 to generate a 20 ms pulse representing the A spike delayed. One shot 102 is coupled to one input of a NAND gate 103 and to a one shot unit 104 for triggering another 20 ms pulse at the trailing edge of the incoming 20 ms pulse. Coupled to second input of NAND gate 103 is a 155 ms denoted as $D_2$ which is denoted as the A capture window, its leading edge being coincident with the QRS trigger. The criteria by which the NAND gate logic 103 is set, is that the delay between the A spike and QRS trigger be no lower than 120 ms and no higher than 275 ms from the onset of the A spike to the QRS peak, to provide for atrial capture. Upon the presence of atrial capture NAND gate 105 will be enabled to provide an A capture output which is routed via NAND gate 105 to activate the capture event indicator. However, when a second input J to the NAND gate 105 will denote an A-V capture inhibit pulse, NAND gate 105 is inhibited for the reason that when in the A-V sequential demand mode with A-V capture, A-capture is meaningless.

When NAND gate 103 is enabled, one shot 106 is triggered to generate a 300 ms pulse denoted as an atrial capture inhibit pulse G. The one shot 106 is connected to NAND gates 107 and 108. NAND gate 107 is also connected from one shot 104 and fed with an input signal J from one ahot 96 in the A-V channel denoting A-V capture inhibit. NAND gate 108 is further fed by an impulse P from QRS timing logic, denoted as the QRS pseudo spike. NAND gates 107 and 108 are each connected to NOR gate 109, the NAND gate 108 being connected via a switch $S_{12}$ and terminal (a). NOR gate 109, in turn, is connected to a NAND gate 111 which is also coupled from one shot 96 providing an A-V capture inhibit pulse J upon occurrence of A-V capture. The output of NAND gate 111 is connected to the non-capture alarm logic 41 disclosed in FIG. 1, via NOR gate 79 in FIG. 7.

Figure 11:
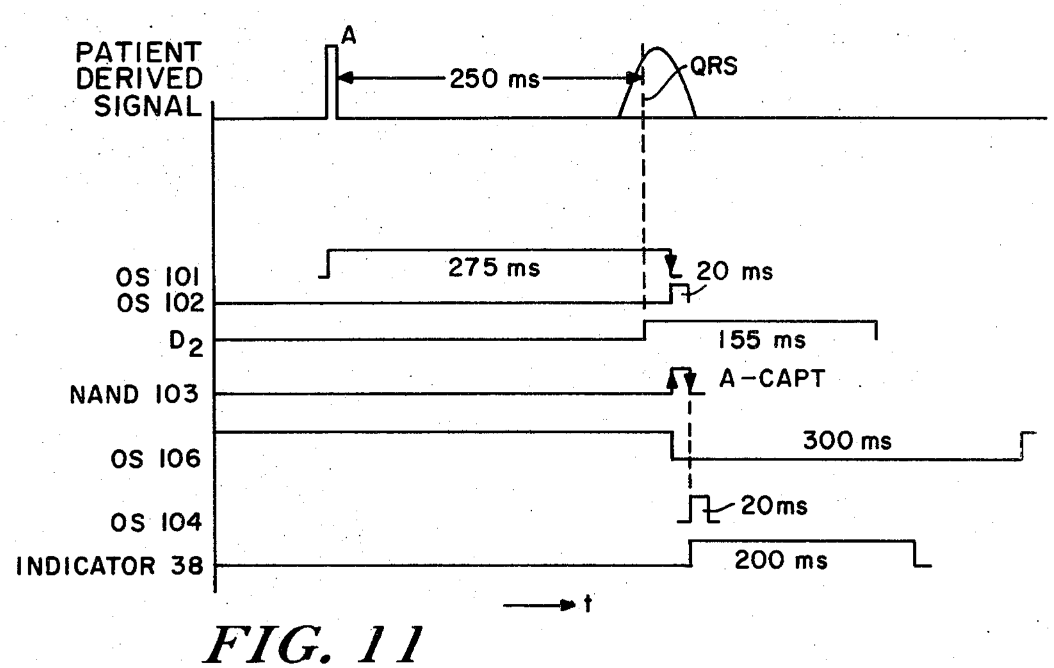
FIG. 11 shows a series of time related waveform to illustrate the operation of the atrial pacing channel with certain assumed QRS and pacer signals.

Assuming in the A-V sequential demand mode a patient derived signal, as depicted in FIG. 11, occurrence of the QRS trigger within the prescribed limits from the onset of the A spike, NAND gate 103 is enabled as the 20 ms delayed A spike from O.S. 102 would fall within the 155 ms A-capture window to denote an A-Capture. However, the capture indicator 38 will only be energized in the absence of A-V capture, as the A-V capture inhibit signal J from O.S. 96 of FIG. 9 would otherwise be present to inhibit NAND gate 105. For NAND gate 107 to be enabled the absence of A-Capture and A-V capture must both occur, in which case non-capture alarm logic 41 is activated and pacer spike indicator 37 is energized.

Assuming an absence of an A-spike in A-V sequential demand mode, because of the A-V toggle switch, the V spike would be routed to the atrial pacing channel. In the case of a missing A and V spikes, O.S. 101 is not triggered so the atrial pacing channel will have not effect, which, of course, presents no problem in the demand mode if the heart rate has not fallen. In the case of a missing QRS trigger with an A spike present, as explained above, NAND gate 107 is enabled to activate the non-capture alarm logic 41 and the pacer spike indicator 37 is energized.

NON-CAPTURE ALARM LOGIC

Figure 13:
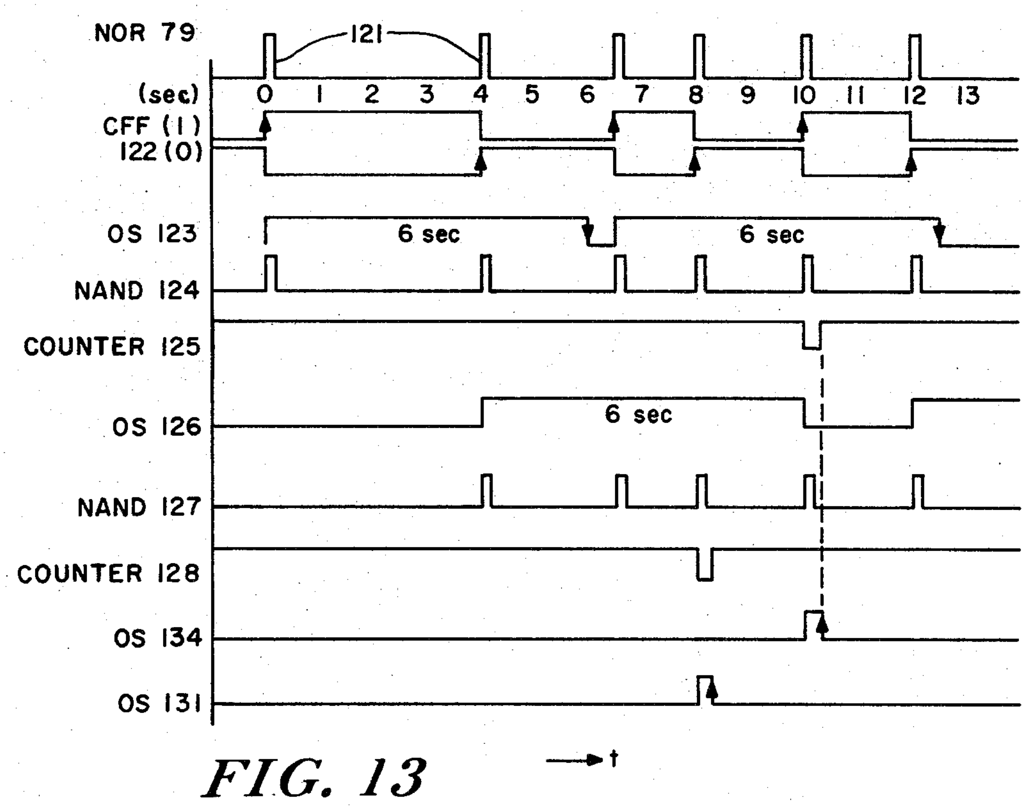
FIG. 13 shows a series of time related waveforms to illustrate operation of the non-capture alarm logic and indicator in FIG. 1.
Figure 12:
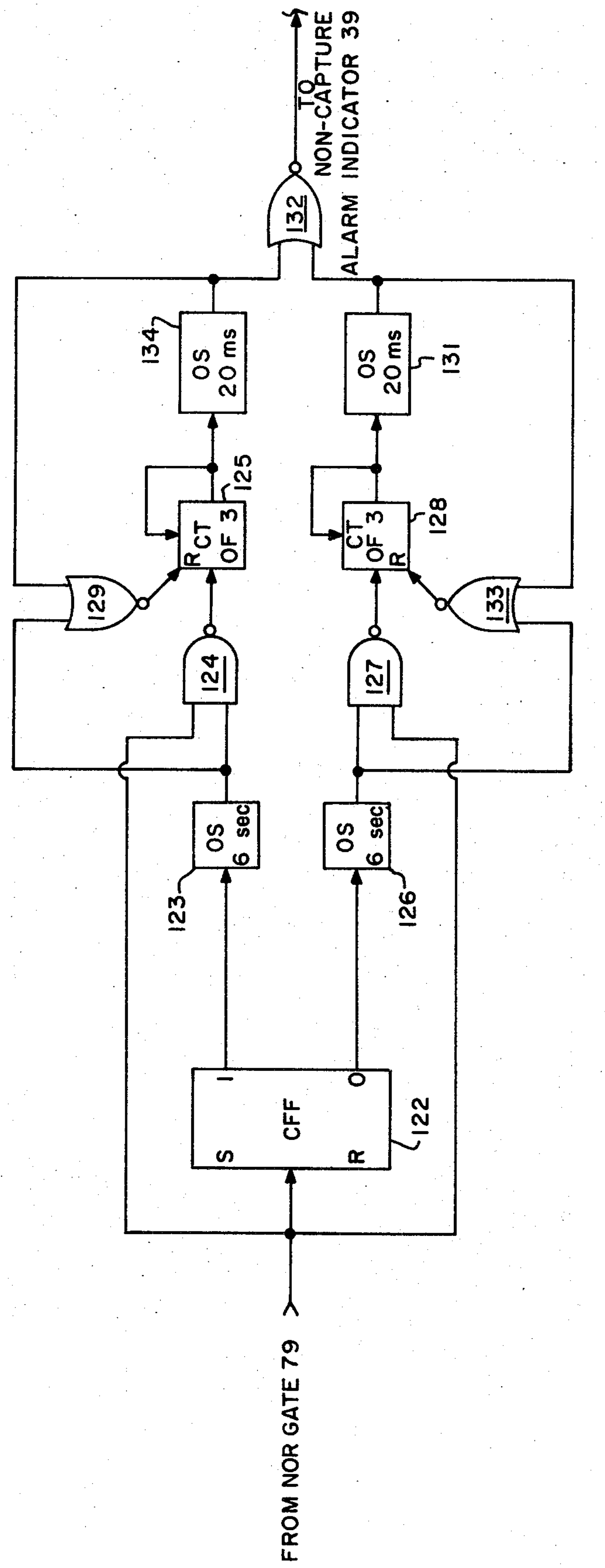
FIG. 12 is a more detailed schematic diagram of the non-capture alarm logic circuit 41 in FIG. 1.

The non-capture alarm logic 41 shown in FIG. 1, may be best described with reference to FIG. 12 and the waveform diagram depicted in FIG. 13. In brief, the purpose of the non-capture alarm logic 41 is to provide an alarm signal after three single pacer pulses, each associated with a non-capture event, have been counted with a continuously updated interval of six seconds. With reference to FIG. 12, output signals from NOR gate 79 of the ventricular pacing channel, denoted as pulses 121 in FIG. 13, are supplied to a control flip-flop 122. The spikes 121 from NOR gate 79 to be counted, are those where a non-capture event in either the A-V pacing channel, the atrial channel or ventricular channel has occurred.

As illustrated, the first of pulses 121 would trigger the control flip-flop at the leading edge of pulse 121 to provide an output that will trigger a one shot unit 123 for a period of six seconds to provide a high output to the NAND gate 124 which will pass the first of said pulses 121 to be counted by a count of three counter 125. The second one of said pulses 121 will flip control flip-flop 122 to trigger the one shot 126 for another period of 6 seconds to provide a high output to the NAND gate 127 which will pass the second one of said pulses 121 to be counted by a count of three counter 128. The second pulse 121 is also counted in counter 125 to provide a count of two since the six second one shot 123 is still enabling NAND gate 124.

At the end of its 6 second period the one shot 123 output goes low to reset the counter 125 to zero through NOR gate 129. The third 121 pulse is now counted as a new count of one in counter 125 and as a count of two in counter 128. The fourth 121 pulse is now counted as a count of two in counter 125 and as a count of three in counter 128 which is still within its 6 second time frame. Counter 128 having counted three pulses within 6 seconds, will fire to trigger a one shot 131 which, in turn through a NOR gate 132, will energize the non-capture alarm indicator 39 shown in FIG. 1. One shot 131 additionally resets counter 128 through a NOR gate 133. In a similar fashion, upon being triggered one shot unit 134 also resets counter 125 through NOR gate 129. Thus, each counter 125 and 128, is capable of being reset either at the end of the 6 second period of its respectively connected one shot unit or by the triggering of either of its output one shot connected units 131 or 134.

As may be observed from FIGS. 12 and 13, the six second window is continuously updated. In addition, by providing, for example, a 10 second lasting non-capture alarm, no single pulses are missed with this counting method. The alarm, of course, could be of the audible or visible type.

OPERATION IN OTHER PACER MODES

As related above, operation of the pacing channels was made with respect to A-V sequential demand mode and how each pacing channel reacts and automatically analyzes the rhythm of the A-V sequential demand type pacer. The following description will briefly cover operation of the three pacing channels and how each automatically analyses the rhythms of the remaining most common forms of cardiac pacer. Each of the switching arrangements of the pacing channels for the different pacing modes is shown at the table in FIG. 6.

Before describing the operation of the other modes, it should be noted that the determination of the failure of the pacer itself may be made by several approaches. For example, in the fixed rate modes loss of a spike would be indicative of pacer failure. In the demand modes a QRS rate below preset limits coupled with the absence of pacer spikes, would be indicative of failure, etc.. Of course, with total pacer failure, the patient will revert to his usual rhythm (most often slower rates), and this would be alarmed by the usual heart rate alarms in conventional patient monitors or by the pacer rate meters for fixed rate pacing.

FIXED RATE VENTRICULAR PACING - This is the simplest form of continuous cardiac stimulation at a preset rate where pacing is independent of the electrical activity of the heart and results in competition between the pace beats and the patient's intrinsic system. In this mode, the A-V toggle flip-flop 28 shown in FIG. 1, remains reset through $S_1$. The pacer spike from cardiac pacer detector 27 then enters through repetition rate discriminator 32 to the ventricular pacing channel 34, whereby the repetition rate discriminator eliminates cardiac pacer pulses below a rate of 48 b/m and above about 180 b/m.

The V pulse is then delayed in the ventricular channel, illustrated at FIG. 7, by the 300 ms one shot 71, its trailing edge activates a 20 ms one shot 73, which in turn enables NAND gate 75 if occuring within the 300 ms capture window $D_1$ from the QRS timing logic 24 to denote ventricular capture. NAND gate 82 is enabled to energize the capture indicator 38. NAND gate 75 generates a 300 ms capture inhibit pulse via one shot 76 to prevent the further delayed pulse of one shot 74 from passing NAND gate 77, thereby preventing the pacer spike indicator 37 from being energized or activating non-capture alarm logic 41.

If the 20 ms pulse of O.S. 73 does not fall within the 300 ms capture window $D_1$, a QRS trigger would either appear to be missing or occur later than the 300 ms period from the V spike stimulation, in which case V-capture would not take place and NAND gate 75 is not enabled. In this case the delayed output pulse of one shot 74 will enable NAND gate 77, to activate the non-capture alarm logic 41 and energize the pacer spike indicator 37. After occurrence of three such non-capture events within a period of 6 seconds, the non-capture alarm indicator 39 is energized.

In the case of a missing V pulse caused by a defective cardiac pacer, ventricular capture again would not take place preventing NAND gate 75 from being enabled. In this case, if the QRS trigger has occurred, the spontaneous heartbeat detector 25 will activate QRS indicator 26 but capture indicator 38 is not energized. At the same time, the QRS pseudo spike C will pass NAND gate 87, closed switch $S_9$, NOR gates 78 and 79 to activate the non-capture alarm logic 41 and energize the pacer spike indicator 37. In the absence of a QRS trigger, conventional alarm logic (not shown) indicating a slower heart rate may also be activated.

DEMAND RATE VENTRICULAR PACING - Similar to fixed rate ventricular pacing, the A-V toggle flip-flop 28 stays reset and the ventricular spike from pacer detector 27 passes through repetition discriminator 32 to the ventricular pacing channel 34. One distinction from the fixed rate pacing is that in the demand mode, the noise inhibition function of the repetition rate discriminator 32 is reduced by elimination of the low-end cut-off demarcation via switch $S_3$so as not to lose the first spike after a spontaneous heartbeat. Otherwise, the logic is similar to the fixed rate logic, switches $S_6$, $S_7$, and $S_8$ being connected to the same terminals. Switch $S_9$, however, is open by connection to terminal (b) in order to prevent a non-capture alarm by way of pseudo spike C from the QRS timing logic.

ATRIAL-VENTRICULAR (A-V) FIXED RATE PACING - As previously described in this mode, there are two sequential pacer spikes, first, the atrial spike for stimulating the atria and then within a preset sequential interval the ventricular spike for stimulating the ventricle. In the present invention the predetermined period for A-V capture lies between approximately 120 ms to 250 ms from onset of the atrial spike. In addition, ventricular capture must occur within 300 ms of onset of the ventricular spike.

With reference to FIG. 1, the atrial spike is separated from the ventricular spike in the A-V toggle flip-flop 28 by resetting the flip-flop with the leading edge of the QRS pulse $D_1$ to condition NAND gate 31 to be first enabled with the first incoming pacemaker spike from detector 27. Accordingly, the first incoming spike is passed by NAND gate 31 and repetition rate descriminator 33 to be fed to the A-V pacing channel and the atrial pacing channel.

In turning to FIG. 9, the 10 ms pulse from one shot 92 at the trailing edge of the 250 ms pulse from one shot 91 will enable NAND gate 95 if falling within the 130 ms A-V capture window M derived from the ventricular pacing channel to provide an A-V capture indication B. The A-V capture inhibit pulse generated by one shot 96 prevents NAND gate 94 from being enabled. Immediately following A-V capture, capture is also detected in the ventricular pacing channel at FIG. 7 in the predetermined period for V-capture between 0 to 300 ms from onset of the V spike. Upon presence of the 20 ms pulse from O.S. 73 within the V capture window derived from QRS pulse $D_1$, NAND gate 75 is enabled to indicate ventricular capture which signal is routed to energize the capture indicator 38. At the same time the V capture inhibit from one shot 76, will prevent the one shot 74 output from enabling NAND gate 77 thereby to preclude activation of the non-capture alarm logic 41 or pacer spike indicator 37 from being energized. With reference to FIG. 2, the V-capture inhibit pulse G will also preclude the spontaneous heartbeat detector 25 from energizing the QRS indicator 26.

In the case of a missing atrial pacer spike, A-V capture via NAND gate 95 in the A-V pacing channel, will not take place. As switch $S_{10}$ is open NAND gate 94 is enabled upon presence of the 20 ms pulse from one shot unit 93 to be routed via NOR gates 98 and 79 to activate the non-capture alarm logic 41 and energize the pacer spike indicator 37.

In the case of a missing ventricular pacer spike, neither A-V capture nor V capture, takes place. Again, absence of the A-V capture inhibit pulse, allows NAND gate 94 to be enabled upon presence of the output of one shot 93 to, in turn, activate non-capture alarm logic 41 and energize the pacer spike indicator 37. With the absence of a V capture inhibit signal G in the ventricular pacing channel a spontaneous heartbeat, if present, will energize QRS indicator 26 via the spontaneous heartbeat detector 25. In the case of missing both A and V spikes, the QRS pseudo-spikes C and P via NAND gates 87 and 97 will cause activation of the non-capture alarm logic 41 and energization of the pacer-spike indicator 37.

In the case of only a missing QRS response, A-V capture takes place as NAND gate 95 is enabled to provide an output signal B to energize the capture indicator 38. In the ventricular pacing channel V-capture, of course, does not take place allowing NAND gate 77 to be enabled and activate non-capture alarm logic 41 and energize the pacer spike indicator 37. Due to the QRS signal absence the spontaneous heartbeat detector 25 is not activated. The light sequence green-blue indicates that the relationship between A and V spikes is correct, but additionally shows a V capture failure, hence a non-capture alarm condition.

ATRIAL FIXED RATE PACING - In this mode the pacer stimulates the atria and the ventricle depolarizes in the normal manner. The predetermined period for A-capture lies between approximately 120 ms to 275 ms from onset of the V spike to presence of a QRS trigger. If this criteria is not fulfilled the non-capture alarm may sound. In this mode, as may be observed from FIGS. 1 and 6 the A-V toggle flip-flop 28 is conditioned to route the first or atrial pulse via NAND gate 31, repetition rate discriminator 33, and the switch $S_4$ into the atrial pacing channel 36 disclosed in FIG. 10. Switch $S_5$ for the A-V pacing channel is in an open position.

With the presence of a QRS signal within the appropriate period, the atrial delayed pulse from one shot 102 will fall within the A-capture window defined by QRS pulse $D_2$ to enable NAND gate 103 and via NAND gate 105 energize capture indicator 38. The atrial capture inhibit pulse from one shot 106 inhibits NAND gate 107 to prevent activation of non-capture alarm logic 41 or energization of pacer spike indicator 37.

In the case of a missing atrial spike with a QRS trigger present no capture occurs. However, NAND gate 108, which is connected via switch 12 to NOR gate 109 will be enabled by the pseudo pulse P from the QRS timing logic 24 to activate non-capture alarm logic 41 and energize pacer spike indicator 37. At the same time the spontaneous heartbeat detector 25 output will energize QRS indicator 26. In such a case the QRS indicator 26 and/or pacer-spike indicator 37, would be indicative of a pacer failure.

In the case of a missing QRS response no atrial capture will take place. The atrial pulse from one shot 105 will, however, via NAND gate 107 activate the non-capture alarm logic 41 and energize pacer spike indicator 37.

In the case where the delay between the atrial pulse an the QRS trigger complex is somewhere outside of the prescribed period between 120 to 275 ms, no atrial capture will take place. Similar to above, non-capture alarm logic 41 will be activated and the pacer spike indicator 37 will be energized through NAND gate 107. The spontaneous heartbeat detector 25 output will also energize the QRS indicator 26.

THE ATRIAL DEMAND PACING - In the atrial demand pacing mode, the patient goes into the pacing mode when the patient's heart rate falls below a preset rate of the pacer. When not paced, the patient, of course, will be alarmed through conventional QRS rate meter limits. The switch settings for the atrial demand case illustrated in FIG. 6, are similar to those of the atrial fixed mode except that switch $S_3$ of the repetition rate discriminator is now open for the same reason as advanced in other demand operations. In this mode, in the case of a missing QRS response or delay between an atrial spike and QRS trigger out of the specified tolerance, except as noted below, the same events will occur as explained above with reference to the atrial fixed pacing. In the case of missing QRS trigger in the demand mode, an alarm condition will rest with the conventional heart rate meters used for this purpose.

The exception here is in the case of a missing atrial spike. Because switch $S_{12}$ is now in an open condition, NAND gate 108 cannot now be enabled upon an A spike absence so that such a case will correspond simply to a spontaneous heartbeat. The explanation behind this comes from the underlying reason for a demand type unit, specifically that a pacer spike is not always needed by the atrial demand pacing patient.

MISCELLANEOUS: It should be understood, of course, that other logic configurations might be employed in the present invention. For example, an alternative method of generating the A-V, V and A capture windows would be to use one shot units driven with the atrial and ventricular pacer spike signals where a QRS pulse of only 10 or 20 ms might be derived to fall within this window. However, to obviate the QRS associated noise and multiple QRS trigger problems that would produce multiple QRS signal problems, the approach disclosed in the Figures as a preferred embodiment was adoped to avoid resort to more complex logic.

In addition, it should be noted that in the ventricular, A-V, and atrial pacer channels the capture windows are extended about ±20 ms or thereabout. This is to offset the inherent slugishness in the QRS rise time in the case of A and V capture and due to differentiation of the A and V spikes by incoming signal processing circuitry encompassed within the cardiac pacer detector 27.

We claim:

1. A monitoring system for indicating the effectiveness of cardiac pacer operation in a cardiac pacer carrying patient with relation to the patient derived QRS comprising:

means for deriving EKG and pacer spike data from a patient and generating a QRS pulse from said EKG data;

circuit means including means for establishment of a predetermined time interval from the onset of a pacer spike, for producing an output pulse upon occurrence of the QRS pulse within said predetermined time interval; and indicator means responsive to said output pulse for denoting occurrence of a capture event.

2. A system according to claim 1 wherein said circuit means further includes means for signaling absence of the QRS from within the predetermined time interval; and second indicator means responsive to said signaling absence means for denoting occurrence of a non-capture event.

3. A system according to claim 2 including:

alarm detection means adapted to respond to said non-capture events and generate an alarm signal upon detection of at least two of said non-capture events within a specified time period; and alarm indicator means responsive to said alarm signal.

4. A system according to claim 3 wherein said alarm detection means includes counter means adapted to energize said alarm indicator in response to a count of a preselected number of non-capture events.

5. A system according to claim 2 whereby said circuit means further includes:

delay means for producing in response to said pacer spike a delayed pulse at the end of said predetermined time interval; and said signaling means including gating means adapted to be enabled by said delayed pulse in the absense of a capture event.

6. A system according to claim 1 including:

QRS indicator means responsive to said QRS pulse; and gate means connected from said circuit means for inhibiting response of said QRS indicator means to said QRS pulse in the presence of a capture event.

7. A system according to claim 1 wherein said circuit means further includes:

first circuit means having a first predetermined time interval from the onset of a ventricular pacer spike, for producing a first output pulse upon occurrence of the QRS within said first predetermined time interval representing occurrence of a ventricular-capture event;

second circuit means having a second predetermined time interval from the onset of an atrial pacer spike for producing a second output pulse upon occurrence of a ventricular pacer spike within said second predetermined time interval representing occurrence of an atrial-ventricular capture event; and third circuit means having a third predetermined time interval from the onset of an atrial pacer spike, for producing a third output pulse upon occurrence of the QRS within said third predetermined time interval representing occurrence of an atrial-capture event.

8. A system according to claim 7 including:

switch means for routing in a cardiac cycle, a first derived pacer spike to said second and third circuit means and a second derived pacer spike to said first and second circuit means.

9. A system according to claim 1 wherein said circuit means includes:

first pulse forming means responsive to the pacer spike for generating a first pulse to continue to the end of said predetermined time interval;

second pulse forming means responsive to said QRS, for generating a second pulse defining a capture window approximately equal to the width of the predetermined time interval; and gating means responsive to simultaneous occurrence of said first and second pulses to denote a capture event.

10. A system according to claim 1 wherein said circuit means includes:

first pulse forming means responsive to a first pacer spike in a cardiac cycle, for generating a first pulse to continue to the end of said predetermined time interval;

second pulse forming means responsive to a successive pacer spike in the cardiac cycle, for generating a third pulse defining a capture window approximately equal to the width of the predetermined time interval; and gating means responsive to simultaneous occurrence of said first and second pulses to denote a capture event.

11. A system according to claim 1 adapted for monitoring a cardiac pacer of the ventricular type wherein said predetermined time interval extends in approximate range of, at least 0 to 300 ms from onset of the ventricular cardiac pacer spike.

12. A system according to claim 1 adapted for monitoring a cardiac pacer of the atrial-ventricular type wherein said predetermined time interval extends an approximate range of, at least 120 to 250 ms from onset of the atrial cardiac pacer spike.

13. A system according to claim 1 adapted for monitoring a cardiac pacer of the atrial type wherein said predetermined time interval extends an approximate range of 120 to 275 ms from onset of the atrial spike.

14. A system according to claim 1 wherein a cardiac pacer of the fixed type is to be maintained including:

second indicator means for denoting the absence of a non-capture event; and gating means responsive to a QRS pulse in the absence of a capture event for energizing said second indicator means.

15. A method of automatically evaluating the effectiveness of a cardiac pacer in a cardiac pacer carrying patient comprising:

deriving from a patient EKG data and pacer spike data and generating a QRS trigger from the EKG data during successive cardiac cycles;

developing a time range from the onset of the pacer spike for defining pacer driving of the QRS;

relating in a cardiac cycle, the occurrence of the QRS with respect to the pacer spike to ascertain if the former falls within said time range; and indicating a capture event when the pacer is found to drive the QRS.

16. A method according to claim 15 including:

signaling the absence of the QRS within said time range to denote a non-capture event.

17. A method according to claim 16 including:

counting a number of non-capture events within a predetermined continuously updated time interval; and indicating an alarm condition upon counting a preselected number of such non-capture events within one of said time intervals.

18. A method according to claim 15 including:

indicating occurrence of each QRS; and inhibiting the QRS indicating step during the occurrence of a capture event.

19. A system for the automatic evaluation of the effectiveness of a cardiac pacer in a cardiac pacer carrying patient comprising:

means for deriving EKG data and pacer spike data;

means for detecting a QRS trigger signal from said EKG data;

circuit means for establishing a minimum and maximum time range from onset of the pacer spike including first means responsive to the pacer spike for producing a delayed pulse of relatively short duration at said maximum time range and a second means responsive to said QRS trigger signal for producing a window pulse having an interval of approximately the difference between the minimum and maximum time range;

first gating means adapted to produce an output pulse in response to simultaneous occurrence of said first and second pulses; and indicator means responsive to said output pulse for denoting occurrence of a capture event.

20. A system according to claim 19 including:

second indicator means for denoting occurrence of a non-capture event;

pulse forming means responsive to said pacer spike for producing a second delayed pulse; and second gating means responsive to said second delayed pulse and the absence of an output pulse at said first gating means, for energizing said second indicator means.

21. A system according to claim 20 including:

alarm logic detection means including counting means adapted to respond to said non-capture events and generate an alarm signal upon detection of at least two of said non-capture events within a specified time period; and alarm indicator means responsive to said alarm signal.

22. A system according to claim 19 wherein said circuit means further includes:

first circuit means with a first set of time ranges and having a first window pulse, for producing a first output pulse upon occurrence of the delayed pulse within said window pulse interval representing occurrence of a ventricular-capture event;

second circuit means with a second set of time ranges and having a second window pulse, for producing a second output pulse upon occurrence of a ventricular pacing spike within said second window interval representing occurrence of an atrial-ventricular capture event; and third circuit means with a third set of time ranges and having a third window pulse, for producing a third output pulse upon occurrence of said delayed pulse within said third window interval representing occurrence of an atrial-capture event.

23. A system according to claim 22 including:

switch means for routing, in a cardiac cycle, a first derived pacer spike to said second and third circuit means and a second derived pacer spike to said first and second circuit means.

* * * * *